(No Model.)
J. MEALEY.
HAME TUG ATTACHMENT.
No. 588,589. Patented Aug. 24, 1897.
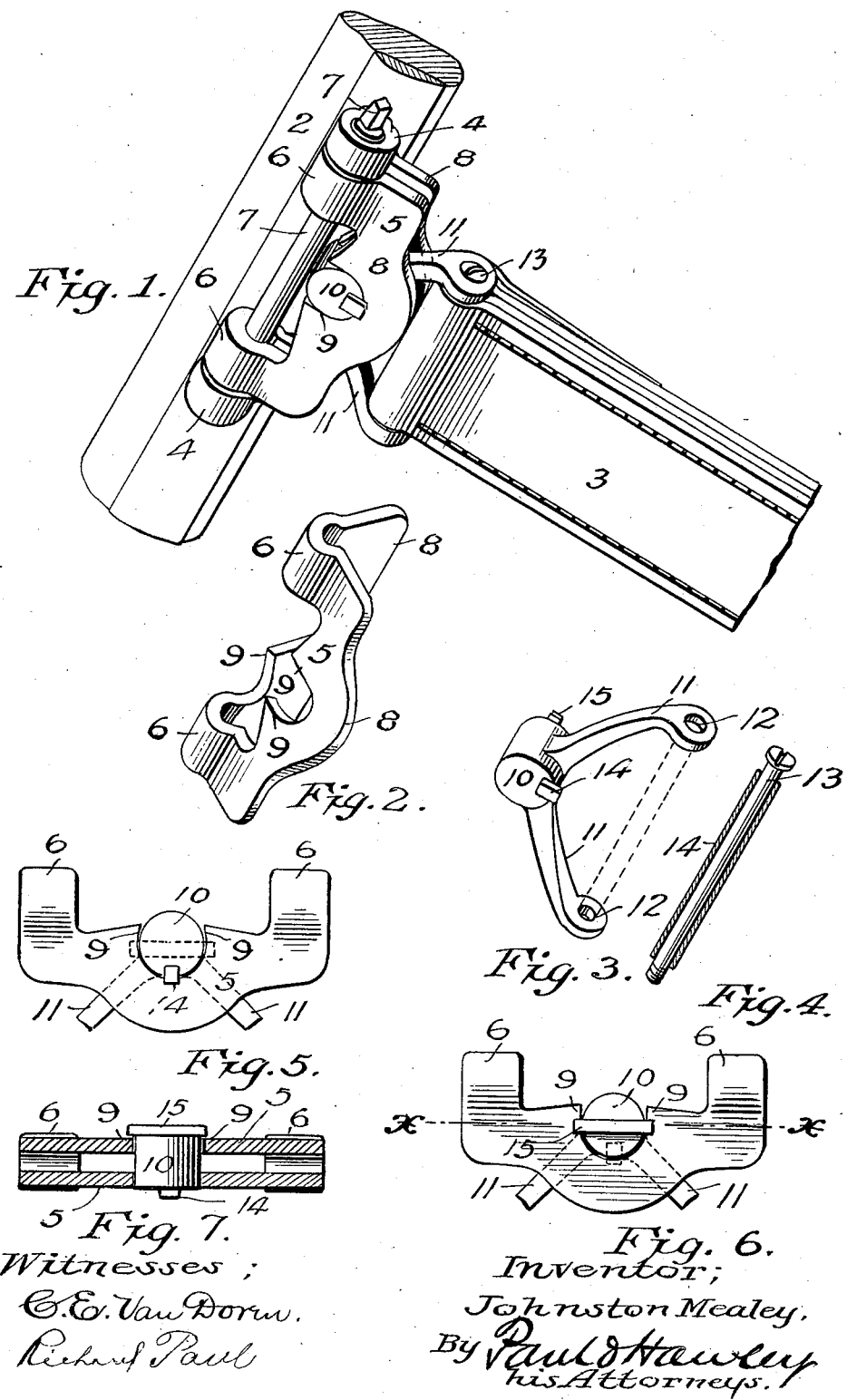
Witnesses:
C. E. Van Dorn.
Richard Paul
Inventor:
Johnston Mealey,
By Paul & Hawley
his Attorneys.

UNITED STATES PATENT OFFICE.

JOHNSTON MEALEY, OF HOWARD LAKE, MINNESOTA.

HAME-TUG ATTACHMENT.

SPECIFICATION forming part of Letters Patent No. 588,589, dated August 24, 1897.

Application filed November 28, 1896. Serial No. 613,741. (No model.)

*To all whom it may concern:*

Be it known that I, JOHNSTON MEALEY, of Howard Lake, Wright county, State of Minnesota, have invented certain new and useful Improvements in Hame-Tug Attachments, of which the following is a specification.

This invention relates to harness, and particularly to means for attaching or connecting the hames and the hame-tugs.

The particular object of my invention is to provide a swiveled attachment between the hame and the tug which will prevent the tearing out of the tug by uneven draft thereon or from the weight of the harness when thrown upon or hung from the pins in the barn.

It is a further and particular object of my invention to provide an attachment comprising only two parts, which may be cast or otherwise manufactured independently and which may be secured together without the use of bolts or rivets.

The invention consists in the combination of two members or clips, one pivoted upon the hame and the other having an integral pivot held or journaled within the first member or clip; and, further, the invention consists in particular constructions whereby the parts are joined with the least possible labor and expense.

The invention will be more readily understood by reference to the accompanying drawings, forming part of this specification, and in which—

Figure 1 is a perspective view showing a hame-tug attachment embodying my invention. Fig. 2 is a perspective view of the first member or clip as it appears before it is closed upon the second member. Fig. 3 is a similar perspective view of the second member or clip. Fig. 4 shows the screw-pin used in connection with the second member. Fig. 5 is a plain side view of the device, a portion of the second clip being broken away. Fig. 6 shows the other side. Fig. 7 is a sectional view on the line *x x* of Fig. 6.

As shown in the drawings, 2 represents the hame, and 3 the hame-tug. The hame is provided with the shackle-eyes 4, between which the clip or attachment is secured. The first member of the attachment or coupling comprises the clip 5, having the open eyes 6 to receive the shackle-bolt 7. The sides 8 of the member 5 extend from the eyes rearwardly and in the middle are provided with the notches or recesses 9 to receive the integral pivot or bolt 10, which is a part of the second member of the device. The second member comprises the integral pivot 10 and arms 11, extending from opposite sides of the middle of the same. These arms are embraced between the sides 8 of the first member, and each arm is provided with an eye 12 to receive the pin or screw 13, upon which the end of the tug 3 is fastened. A ferrule 14 is preferably employed around the pin and between the eyes or ends of the arms 11 for the double purpose of preventing wear upon the leather tugs and to prevent the collapse of said arms. The pivot 10 is equal in length to the combined width or thickness of the two parts 8 and the intervening arms 11. The original form of the first member 5 is shown in Fig. 2, the sides 8 being separated far enough to admit the pivot or head 10 between them.

The member 5 is made from sheet metal or is a malleable casting, which admits of the folding together of the sides 8 to closely embrace the arms 11, though enough space is left between them for the free movement of such parts of the second member or clip. To prevent the draft upon the pivot-pin from spreading the sides 8, I provide lugs 14 and 15 upon the ends of the part 10, and these lugs lap upon the sides 8 and prevent the spreading thereof. The pivot or head 10 takes up all the space between the bottoms of the recesses or notches 9 and the bolt 7, so that it cannot escape from the notches 9. In this simple manner I provide a perfect swivel of but two parts and those parts of the most simple, cheap, and durable form. Obviously changes may be made in the detail construction of my device. The pin 13 may, if desired, be made integral with the second clip or member, or such member may be provided with a more extended and possibly more desirable connection for the tug; but in the main I believe that such changes would increase the cost of the device without greatly benefiting the same.

Having thus described my invention, I claim as new and desire to secure by Letters Patent—

1. In a hame attachment, a member comprising a bent frame, the loop of which is adapted to receive the pivot upon the hame, the sides of said frame having notches or recesses, in combination, with a second member having its sides embraced between the sides of the first member, and having an integral pivot seated in the notches or recesses of the first member, substantially as described.

2. In a hame attachment, a member comprising a bent frame, the loop of which is adapted to receive the pivot upon the hame, the sides of said frame having notches or recesses, in combination, with a second member having its sides embraced between the sides of the first member, and having an integral pivot seated in the notches or recesses of the first member, and said integral pivot having lugs to engage the sides of the first member to prevent the same from spreading, substantially as described.

3. The combination, in a hame-tug attachment, of a clip adapted to be pivoted upon the hame and having two side portions 8 each provided with a notch or recess, and a second clip having an integral pivot journaled in said notches and prevented from lateral movement therein by engagement with the pivot pin or bolt of the first member, substantially as described.

4. In a hame-tug attachment, the first member having the eye portions 6 and the side parts 8, each side part having a notch 9, in combination, with a second member having eyes 12 to receive a pin or screw, said second member also having the integral pivot 10 journaled in said notches 9 and having the lug to engage and prevent the spreading of the sides of the first member, substantially as described.

In testimony whereof I have hereunto set my hand this 19th day of September, A. D. 1896.

JOHNSTON MEALEY.

In presence of—
RICHARD PAUL,
C. G. HAWLEY.